United States Patent

[11] 3,590,687

| [72] | Inventor | Alvin L. DuBrown<br>Corona Del Mar, Calif. |
|---|---|---|
| [21] | Appl. No | 716,900 |
| [22] | Filed | Mar. 28, 1968 |
| [45] | Patented | July 6, 1971 |
| [73] | Assignee | Cadillac Gage Company<br>Detroit, Mich. |

[54] SERVOSYSTEM
5 Claims, 3 Drawing Figs.

[52] U.S. Cl..................................................... 91/367,
91/370, 91/384
[51] Int. Cl....................................................... F15b 9/10,
F15b 13/16
[50] Field of Search........................................... 91/433,
384, 367, 370

[56] References Cited
UNITED STATES PATENTS

| 2,995,014 | 8/1961 | Horky et al. | 91/433 |
| 3,272,062 | 9/1966 | Flippo et al. | 91/384 |
| 3,398,647 | 8/1968 | Baltus et al. | 91/384 |

Primary Examiner—Paul E. Maslousky
Attorney—Harvey C. Nienow

ABSTRACT: The specification describes a servosystem which, in the specific form selected for illustration, comprises a hydraulic servo for position control of the aileron, spoiler, elevator, rudder or other aircraft control surface. The servo includes a minor feedback loop in which the gain of the primary loop is altered inversely to the force opposing change in spoiler or elevator position. The specification also describes a novel and advantageously employed mechanical adder and gain changing mechanism.

PATENTED JUL 6 1971

3,590,687

INVENTOR.
ALVIN L. DUBROW
BY
*Harry C. Hearns*
ATTORNEY 3,590,687

SERVOSYSTEM

This invention relates to improvements in servosystems generally, and it relates in particular to improvements in hydraulic servosystems employed in position control.

An object of the invention is to provide a servosystem having improved stability characteristics.

Another object is to provide, for controlling the state of some condition, a servosystem in which system gain is variable as a function of the forces tending to alter the state of said condition.

While not limited thereto, the invention is particularly well suited to the provision of improved hydraulic servosystems of the kind employed in positioning a control surface of vehicles such as aeronautical and space vehicles. Thus, an object is to provide an improved aircraft aileron, spoiler, rudder, and elevator control system.

Another object is to provide an improved hydraulic positioning control for aircraft flight control surfaces which integrates manual or pilot inputs with automatic flight controller inputs. These and other objects and advantages of the invention which will hereinafter appear are realized in part by the provision of a servosystem comprising a controller which operates upon the controlled element to control the state of some condition, an adder which compares the desired action with the actual action of the controller to produce an error signal variable with their difference, and an amplifier which applies the error signal to activate the controller. These elements are combined with means responsive to the magnitude of the effect that tends to alter the state of the controlled condition from the desired condition for modifying the gain of the amplifier in proportion to the degree of the unbalancing effect.

While the invention is not limited to position control servos it is especially well suited to position control and a position controller has been selected for illustration in the drawings. In this system the primary error signal is indicative of the difference between desired position and actual position of the controller. Unbalance of the controlled element is a function of force on that element and means are provided for measuring the magnitude of that force and modifying the feedback signal in proportion to the magnitude of that unbalancing force. The feedback is modified by varying system gain to diminish gain as unbalancing force is increased.

In addition to being a position control servo the system selected for illustration in the drawings employs hydraulic elements. The controller is a hydraulic actuator or piston-cylinder combination. In a system employing an actuator of given size, the magnitude of the differential pressure across the actuator is a measure of system instability. The effect of the force feedback loop which is a feature of the invention is to minimize that differential pressure wherefore system stability is enhanced.

The invention includes a novel hydromechanical arrangement for adding mechanical and electrical inputs to find their algebraic difference and to amplify their difference in variable degree. In the embodiment selected for illustration this feature is incorporated in a sleeve and spool arrangement in which both the sleeve and the spool are movable relative to one another and relative to fixed input and output ports. Lever systems are provided for moving both the sleeve and the spool and in the case of both lever systems means are provided for altering the position of the lever fulcrum whereby a maximum of mathematical computation is accomplished with a minimum of mechanical complication.

The provision of these features and advantages are other objects of the invention. And still other advantages will be apparent upon examination of the specification which follows and of the appended drawings showing one embodiment of the invention. It is to be understood that various modifications may be made in the embodiment shown and that other embodiments of the invention are possible without departing from the spirit of the invention or the scope of the appended claims.

Figure 1:
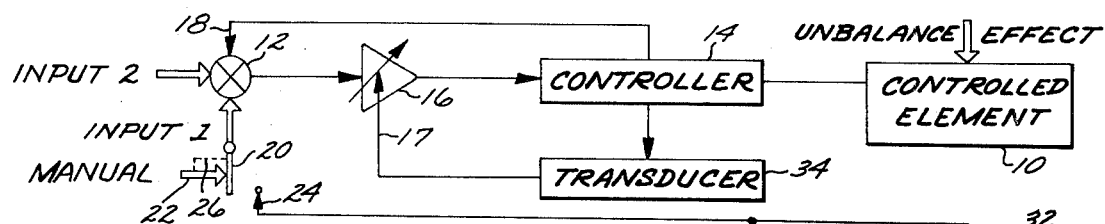
FIG. 1 is a block diagram of a servosystem embodying the invention and incorporating both manual and automatic input functions.

Referring to FIG. 1 of the drawings there is shown a controlled element 10 the state of whose condition it is the purpose of the system to control. Not only is the state of that condition to be modified from time to time in accordance with inputs applied to an adder 12 but the state is also effected by an unbalancing effect which acts to oppose alteration of the state with changes in the inputs to the adder 12 or which acts independently to modify the state for any given set of inputs to the adder 12. The state or condition of the controlled element 10 is altered by a controller 14. The controller responds to an input signal which represents the difference between the effect that it has on the controlled element and the desired effect represented by one of the inputs to the adder 12. Thus the output of the adder 12 is applied to the controller 14. However, to insure adequate input to the controller the output of adder 12 is amplified in an amplifier 16. An arrow drawn through the amplifier in FIG. 1 indicates that its gain is variable as a function of a signal applied to the amplifier by a line 17 terminating at the center of the arrow. Three inputs are provided to the adder 12. Inputs 1 and 2 are applied from points external to the control system. The third input is a feedback signal applied by line 18 from the controller 14 to the adder 12. This signal indicates the current state of the controller or the current controlled condition imposed by the controller 14 on the controlled element 10. In the system shown in FIG. 1 a switch 20 is provided by which input 1 can be connected to a manual input control 22 or an automatic input control 24. The dashed line 26 indicates provision for overriding the switch to apply manual control regardless of connection to automatic control. The automatic control system comprises an automatic controller 28 whose output is applied to an actuator 30. The output of the actuator is applied to the automatic input 24 and is also applied to a transducer 32 whose output is applied as a feedback signal to the automatic control 28. The automatic control 28 may, for example, comprise the automatic pilot of an aircraft. The system of FIG. 1 is completed by a transducer 34 which measures the unbalanced effect applied to the controlled element 10 and has an output connected to amplifier 16 which varies the gain of the amplifier as a function of the magnitude of the unbalanced effect.

Thus described FIG. 1 comprises some element the state of whose condition is to be controlled and whose state is variable by an unbalancing effect. It also comprises means for altering the state of the controlled condition or element. It comprises means for comparing the effect of the means for controlling the element to be controlled with some desired input effect. And, it also comprises means responsive to the magnitude of the unbalancing effect for altering the degree of response of the means for controlling the element to be controlled to the difference found by the means for comparing effects.

While FIG. 1 does not necessarily describe a hydraulic system for control of the control surfaces of an aircraft, it can and does describe such a system. Accordingly in addition to representing servosystem elements broadly, the various elements of FIG. 1 also represent the specific elements of any particular system such for example as the hydraulic aircraft aileron control system, which fall within the broad definition set out above for the system. In that case the controlled element 10 would be the aileron of the aircraft. The unbalanced effect would be windage acting on the surface and the controller 14 would be an actuator such as a piston connected to the surface and a cylinder connected to the aircraft wing.

Figure 2:
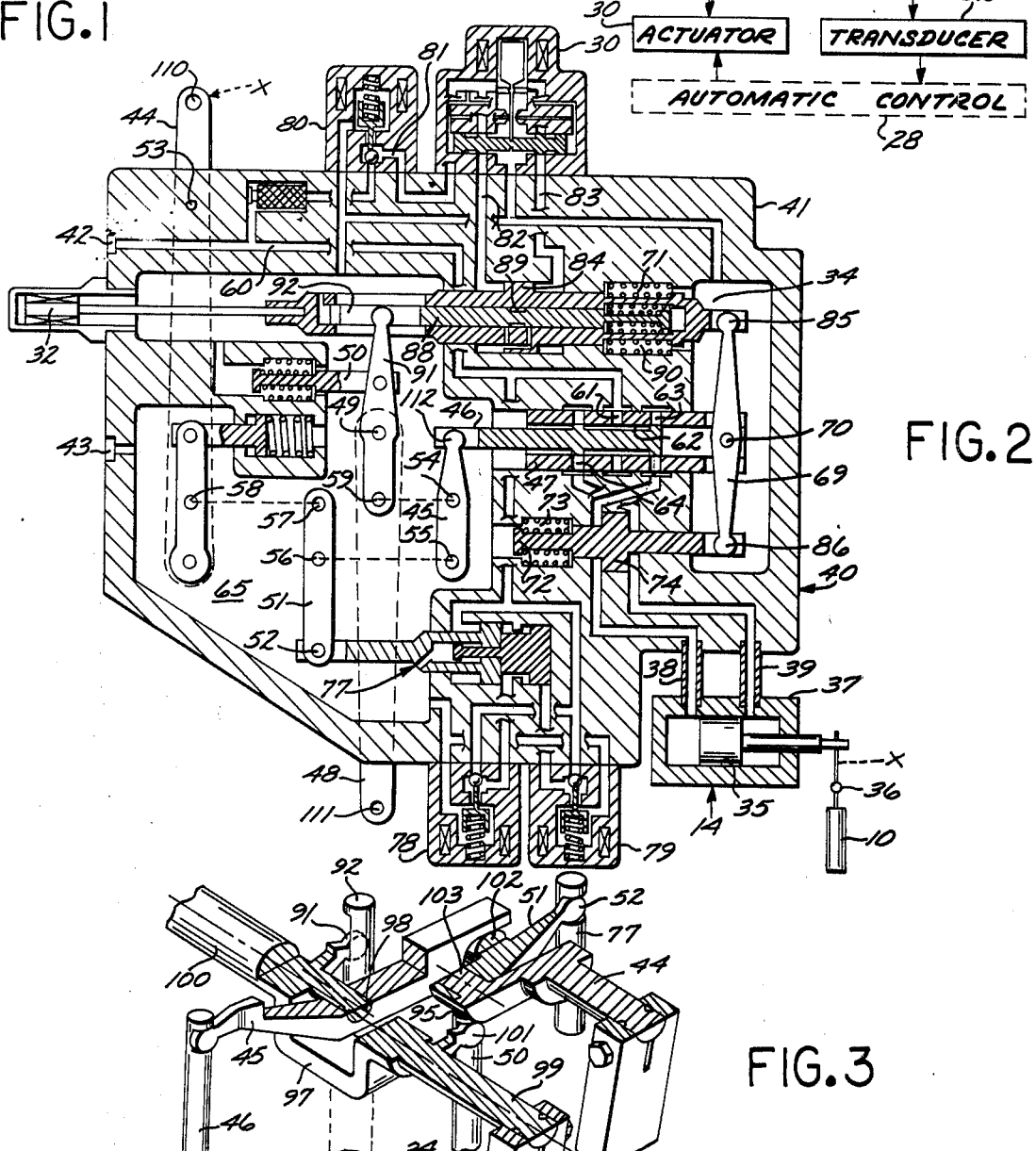
FIG. 2 is a schematic diagram of the servo system of FIG. 1 omitting the automatic control element which is indicated by dotted lines in FIG. 1.

Such a system is shown in FIG. 2. The surface 10 is connected to a piston 35 for movement about a pivot 36 as the piston is moved back and forth within its cylinder 37. Together the piston and cylinder comprise the controller 14. Two hydraulic lines designated 38 and 39 connect the cylinder at opposite sides of piston 35 to a control unit generally designated 40. The control unit is represented by a housing 41 which contains various fluid passages for conducting hydraulic fluid from an input port 42 to an output port 43 which are understood to be connected to a source of pressurized hydraulic fluid. Port 42 is connected to the output of that source and port 43 is connected to the return line of that source. Housing 41 also comprises various cavities containing hydraulic control elements.

The dashed line terminating at X in the lower right-hand corner of FIG. 2 represents a mechanical connection from the surface via the X and dashed line to the lever 44 in the left-hand corner of FIG. 2. This connection represents the feedback line 18 of FIG. 1. Information about the effect of controller 14 upon controlled element 10, or more specifically information about the position to which surface 10 is moved by piston 35, is transmitted by that dashed line through lever 44 and a lever system to be described in greater detail below to a lever in the center of FIG. 2 and designated by the numeral 45. This lever 45 is the output element of the lever system which comprises the adder represented by the numeral 12 in FIG. 1. The upper end of lever 45 is connected to the piston of the piston and spool combination which together with fixed ports in the housing 41 comprises the amplifier 16 of FIG. 1. In FIG. 2 the piston is designated by the numeral 46, the spool is designated by the numeral 47.

Manual input to the system is applied through lever 48, at the lower left in FIG. 2, from the pilot's manual surface control mechanism. Lever 48 pivots about pivot point 49 and is normally held in a central position by a centering spring and distant arrangement 50. Movement of the lever 48 to the right in FIG. 2 has the effect of moving piston 35 to the right. The surface is pivoted clockwise and for the purposes of description this direction is designated "up."

In addition to levers 44, 45 and 48 the adding unit designated 12 in FIG. 1 also comprises a lever 51. For the sake of clarity it will be assumed temporarily that lever 51 pivots about the fixed pivot point 52. Lever 44 pivots about pivot point 53 and lever 45 pivots about either one of points 54 by which it is connected to lever 48 or point 55 by which it is connected to point 56 of lever 51. Point 56 is between point 52 and a point 57 by which the lever 51 is connected to the lever 44 at point 58.

Operation of the major system loop with manual input will now be described. Upon movement of lever 48 to the right in FIG. 2 to pivot it about its pivot point 49 lever 45 will be rotated in the clockwise direction about pivot point 55 by virtue of the connection of point 54 on lever 45 to point 59 on lever 48. This action will tend to move spool 46 to the right in FIG. 2. Hydraulic fluid in line 60, under pressure applied by the source, not shown, to input port 42, flows through input port 61 of the sleeve 47 into the space 62 between the ends of the spool 46. Upon movement of the spool 46 to the right the outlet port 63 is uncovered permitting the flow of hydraulic fluid through line 38 to the left of piston 35 to force the piston to the right. Movement of the spool 46 to the right also uncovers outlet port 64 of the sleeve 47 permitting fluid to flow from the right side of cylinder 37 to line 39 to the interior cavity 65 of housing 41 from which it flows through port 43 back to the source, not shown.

Having moved lever 48 to the right to raise the controlled surface the pilot holds it there to wait for the desired response. The piston 35 moves to the right and its displacement results in displacement of the surface 10. The lever 44 is moved to the right as a result of displacement of the surface 10. This lever rotates about its pivot point 53 whereupon lever 51 is rotated about pivot point 52 by virtue of interconnection of levers 51 and 44 from point 57 to point 58. Accordingly lever 51 is rotated clockwise about point 52. Lever 45, in view of the connection between points 55 and 56, is rotated counter- clockwise about point 54 which is now held stationary by the pilot holding lever 48 displaced to the right. This counterclockwise rotation of lever 45 moves the spool to the left in FIG. 2 sufficiently so that the piston ends with a spool cover and close the exit ports 63 and 64 of sleeve 47 whereupon motion of piston 35 and rotation of the aileron 10 ceases and it remains displaced in a degree proportional to the degree of displacement of the manual input lever 48.

The action is reversed if lever 48 is moved to the left in FIG. 2. In this case the spool is moved to the left permitting the flow of pressurized hydraulic fluid through port 61 of sleeve 47 to the interpiston space 62 of spool 47 and out of outlet port 64 and through line 39 to the right side of piston 35 to move the piston to the left. Fluid in the left cavity of cylinder 37 is expelled by line 38 and outlet port 63 of the sleeve 47 into cavity 65 and then to the power supply by return port 43. Movement of the feedback lever by the feedback linkage tends to move the lever 45 in the clockwise direction to move the spool to the right to close off the ports when piston 35 and aileron 10 have moved to the position corresponding to the degree of displacement to the left of the manual input lever 48 at which time piston 35 motion ceases.

In FIG. 2 a lever 69 has pivotal connection at a point 70 to sleeve 47 of the amplifier or metering valve 16. The upper end of this lever has pivotal connection to a transducer 34 to be described below. At this point it will be assumed that this upper pivot point is fixed and, indeed, in the absence of automatic control its position is fixed by the centering spring arrangement 71. The other end, the lower end in FIG. 2, of lever 69 has pivotal connection to the shaft of a piston 72 which is normally held in the intermediate position shown by a centering spring arrangement 73. The piston assembly 72 comprises a double faced piston 74 one face of which is subjected to the pressure in line 38 and the other face of which is subjected to the pressure in line 39. The operation and effect of this piston is explained as follows. When the manual input lever 48 and the surface 10 occupy the central position they are shown to have in FIG. 2 the pressure on opposite sides of piston 35 of the controller 14 is equal and very little load effect is felt at surface 10 to disturb this relationship. However, when lever 48 is displaced to one side or the other and the surface is displayed to one side or the other then considerable load force will be exerted upon the surface to move it back to central position and that force will tend to oppose motion of piston 35 to move the surface to that displaced position. This pressure difference appears as a pressure difference across the faces of the piston 74 and it moves that piston against the force of centering spring 73 to the left or right in FIG. 2 depending upon whether the pressure in line 38 or 39 is the greater. Suppose for example that the pilot had moved lever 48 in the "up" direction which is right in FIG. 2. Spool 46 will have been moved to the right and hydraulic fluid in line 38 would be pushing piston 35 to the right whereby the pressure in line 38 would exceed the pressure in line 39. In the absence of load the pressure differential would be minimum. However, the load force would tend to oppose piston motion and the pressure differential between lines 38 and 39 would be increased. The amount of increase would be greater at higher aircraft speeds. Piston 74 would be moved to the right in FIG. 2 in proportion to the degree in which the pressure in line 38 exceeds the pressure in line 39. Movement to the right of piston 74 moves the lower pivot point of lever 69 to the right. This lever having a fixed pivotal connection at its upper end to the transducer assembly 34, lever 69 will be rotated counterclockwise and will carry sleeve 47 to the right. It was motion of spool 46 to the right relative to said sleeve 47 that opened port 63 to admit hydraulic fluid to line 38. Movement to the right of sleeve 47 relative to spool 46 tends to close port 63 so that the quantity of fluid per unit time which is permitted to flow to line 38 is diminished. Consequently the effect of piston 74 is to diminish the rate at which hydraulic fluid is applied to the controller 14 to actuate piston 35 in proportion to the degree of opposition experienced by piston 35 in accomplishing the control movement dictated by movement of the input lever 48. Stated another way, piston 74 moves sleeve 47 relative to spool 46 in a direction to diminish the rate at which hydraulic fluid is applied to the controller or to diminish the gain of the system. Conversely, when piston 35 experiences less opposition to movement to alter the position of the aileron the differential across lines 38 and 39 will be less, the displacement of piston 74 will be less and the movement of sleeve 47 will be less whereby the system will respond more rapidly to displacement of input lever 48.

Throughout the discussions of the operation of the main loop with manual input and of the accomplishment of variable gain, it was assumed that pivot point 52 was fixed relative to the housing 41. In the embodiment selected for illustration this is true except that provision is made for moving pivot point 52 relative to housing 41 for airbrake operation. Pivot point 52 is carried by a piston assembly generally designated 77 which is moved to the left in FIG. 2 by hydraulic fluid applied through line 60 when solenoid operated valves 78 and 79 are actuated to apply hydraulic fluid to the working faces of the piston assembly 77. When the piston assembly moves pivot point 52 to the left lever 51 is rotated clockwise which results in clockwise rotation of lever 45 at movement of the spool to the right which results in displacement of piston 35 to the right so the surface is moved clockwise.

Throughout the preceding discussion it was assumed that the transducer assembly 34 occupied the position it is shown to have in FIG. 2 and that it did not move. This point does not move in the absence of activation of the automatic control because of the action of centering spring 71. However, when automatic control is desired the electromagnetic valve 80 is actuated to open hydraulic supply line 81 to an electromagnetic actuator or control valve 30 mounted upon the housing 41. The control valve 30 directs hydraulic fluid in variable quantity to one of two outlet lines designated 82 and 83 respectively. Hydraulic fluid is applied by lines 82 and 83 to the left-hand and right-hand faces of a double faced piston 84 and the piston is moved right or left depending upon whether the pressure in line 83 or line 82 is greater. The piston 84 is carried on a shaft which at its right end has pivotal connection at point 85 to the upper end of the lever 69. At its other end the shaft of piston 84 is connected to the movable core of a pick off transformer or transducer 32 by which information concerning the effect of actuator 30 is transmitted back through the feedback loop to the automatic pilot 28 of FIG. 1. If the pilot does not move manual input lever 48 the spool 46 will remain stationary relative to the housing 41. Signals applied by the automatic pilot to the actuator 30 will result in the application of variable pressure to the faces of piston 84 and that piston will be moved from left or right to carry the upper end of lever 69 left or right and rotate the lever about pivot point 86 at which the lower end of lever 69 is connected to the piston assembly 72 of the force feedback system. Such rotation of lever 69 will result in movement of sleeve 47 to the left or right relative to spool 46.

The primary feedback linkage operates as in the case of manual input by rotation of lever 45 to move spool 46 relative to the sleeve outlet ports to close them when the aileron 10 reaches the position dictated by the actuator 30. Moreover, the force feedback mechanism comprising piston assembly 72 and centering spring 73 function as described above except that point 85 moves in response to operation of piston 84 by actuator 30.

The piston 84 and the piston rod are bored along their axis to accommodate a central control rod 88. Holes formed in the piston 84 communicate from each face of the piston 84 to the central bore. The control rod 88 is provided with ports 89 that complete communication from one face of the piston to the other if the central control rod is moved left or right from the normal central position in which it is held by centering springs 90 relative to piston 84. When communication is completed by left or right movement of rod 88 relative to piston 84 the piston is no longer responsive to hydraulic fluid pressure from actuator 30 but is moved to central position by centering spring 71. Relative motion of rod 88 and piston 84 is accomplished by arm 91 of manual input lever 48. Arm 91 moves in a slot 92 in rod 88 but it engages and moves the rod at the left and right extremes of manual input lever motion whereby to provide manual override of automatic control.

Figure 3:
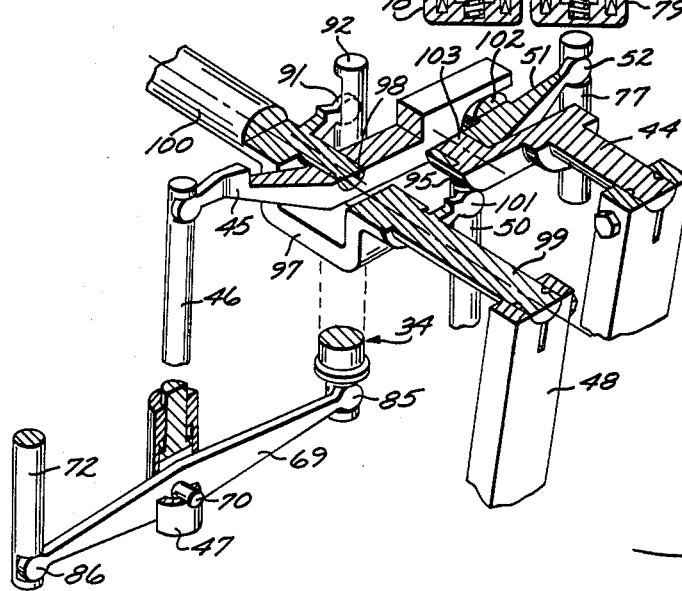
FIG. 3 is an isometric diagram showing a preferred arrangement of the several mechanical linkages incorporated in FIG. 2.

The various mechanical linkages of the system shown schematically in FIG. 2, advantageously have the form shown in FIG. 3. At the lower left the lever 69 is shown to have pivotal connection by pivot pin 70 to sleeve 47 of the control valve or amplifier 16. The spool 46 of the amplifier is moved relatively to sleeve 47 by the lever 45 which has rotatable connection to the spool as it rotates about an axil 98 carried by a yoke 97. The yoke is rotatable about a yoke axis extending through its trunnions 99 and 100 the axis of axil 98 is parallel to but is offset from the yoke axis. This offset corresponds to the connection between points 54 and 59 in FIG. 2.

An arm 101 extending rightward in FIG. 3 from trunnion 99 has rotatable connection to the vertically movable manual input centering mechanism 50. Lever 48 is the manual input or pilot input lever. The lever 91 which extends rightwardly in FIG. 3 from trunnion 100 has a lost motion connection to rod 92 of the automatic control piston unit 34 engaging the rod near the limits of right and left rotation of the input lever or arm 48. The end of the piston unit 34 is pivotally connected at point 85 to the lever 69. At the other end of the lever, at point 86, it is pivotally connected to the force feedback piston assembly 72.

The right end, in FIG. 3, of lever 45 is bifurcated to accommodate axil 102 which extends laterally from the lever 51. This axil has rotatable connection to lever 45 to the fork and operates to rotate lever 45 about axil 98 when lever 51 is rotated about point 52, at which point it has pivotal connection to the airbrake piston assembly 77, or about axil 103, at which axil the lever 51 is connected to the feedback lever 44. The connection between axil 102 and the fork of lever 45 corresponds to the connection between points 56 and 55 in FIG. 2 and the pivotal connection of axil 103 to lever 51 corresponds to the connection between points 58 and 57 in FIG. 2.

The operation of the mechanism of FIG. 3 is described above as part of the description based on FIG. 1 of system operation. It combines in a single package and relatively uncomplicated structure the functions of algebraic addition of mechanical or automatic position input with position feedback and a predetermined optional position input (here the airbrake input) with the function of amplifier gain control. Each of the levers 44, 51, 45, 48 and 69 comprises a fulcrum point, an input point and an output point. Their fulcrum points are designated 53, 52, 55, 49 and 85, respectively. Their input points are designated 110, 57, 54, 111 and 86, respectively. Their output points are designated 58, 56, 112, 59 and 70 respectively. Output points 112 and 70 are connected to the piston or spool 46 and to the sleeve 47 respectively of the amplifier valve. Fulcrum point 85 is movable by one alternative input signal, fulcrum point 52 is movable by another alternative input signal, and fulcrum point 55 is movable by the output point 56 in response to the primary feedback signal or said other alternative input or both. The third alternative input, the pilot input, is applied to the input point 54 of lever 45.

I claim:

1. A servosystem for controlling the position of an element to be controlled comprising in combination:
    a. controller means responsive to a controller input signal and having an output for positioning an element whose position is to be controlled according to a system input signal;
    b. adder means comprising an adder responsive to said input signal and the output of said controller means for providing a difference signal;
    c. variable gain amplifier means responsive to said difference signal for furnishing a controller input signal to said controller means;

d. force feedback means responsive to forces opposing control of said element for altering the gain of said amplifier means as a function of said forces;

e. in which said variable amplifier means comprises a valve defining a flow path and having two control elements both movable to alter the flow capacity of said flow path in accordance with the degree of relative motion between said elements; and f. in which one of said control elements is a spool and the other is a ported sleeve adapted to receive the spool and to be received in the valve.

2. A servosystem for controlling the position of an element to be controlled comprising in combination:

controller means responsive to a controller input signal and having an output for positioning an element whose position is to be controlled according to a system input signal;

adder means comprising an adder responsive to said input signal and the output of said controller means for providing a difference signal;

variable gain amplifier means responsive to said difference signal for furnishing a controller input signal to said controller means; and force feedback means responsive to forces opposing control of said element for altering the gain of said amplifier means as a function of said forces;

in which said variable amplifier means comprises a valve defining a flowpath and having two relatively movable control elements both movable to alter the flow capacity of said flowpath in accordance with the degree of relative motion between said elements; and in which said adder comprises at least three levers each comprising a fulcrum point, a force input point at which force is applied to the levers respectively and a force output point by which force is applied by the levers respectively; a first one of said levers having connection at its output point to one of said control elements, its fulcrum connected to the output point of a second one of said levers, and its input point connected to the output point of the third one of said levers; means for applying said input signal to one; and means for applying said output of said controller to the other of the input points of said second and said third levers.

3. A servosystem for controlling the position of an element to be controlled comprising in combination:

controller means responsive to a controller input signal and having an output for positioning an element whose position is to be controlled according to a system input signal;

adder means comprising an adder responsive to said input signal and the output of said controller means for providing a difference signal;

variable gain amplifier means responsive to said difference signal for furnishing a controller input signal to said controller means;

force feedback means responsive to forces opposing control of said element for altering the gain of said amplifier means as a function of said forces;

in which said variable amplifier means comprises a valve defining a flow path and having two control elements both movable to alter the flow capacity of said flow path in accordance with the degree of relative motion between said elements;

in which said adder comprises at least three levers each comprising a fulcrum point, a force input point at which force is applied to the levers respectively and a force output point by which force is applied by the levers respectively; a first one of said levers having connection at its output point to one of said control elements, its fulcrum connected to the output point of a second one of said levers, and its input point connected to the output point of the third one of said levers; means for applying, said input signal to one and means for applying said output of said controller to the other of the input points of said second and said third levers; and a fourth lever having a fulcrum point, a force input point and a force output point, said force output point being connected to the other of said control elements, and in which said force feedback means comprises means for displacing said input point of said fourth lever as a function of said forces opposing control.

4. The invention defined in claim 3 in which said adder further comprises means for displacing said fulcrum point of said fourth lever as a function of the desired displacement of said element to be controlled.

5. A servosystem for controlling the position of an element to be controlled comprising in combination:

a. controller means responsive to a controller input signal and having an output for positioning an element whose position is to be controlled according to a system input signal;

b. adder means comprising an adder responsive to said input signal and the output of said controller means for providing a difference signal;

c. variable gain amplifier means responsive to said difference signal for furnishing a controller input signal to said controller means; and d. force feedback means responsive to forces opposing control of said element for altering the gain of said amplifier means as a function of said forces, said variable amplifier means comprises a valve defining a flow path and having two relatively movable control elements both movable to alter the flow capacity of said flow path in accordance with the degree of relative motion between said elements, and further comprising.

UNITED STATES PATENT OFFICE
CERTIFICATE OF CORRECTION

Patent No. 3,590,687  Dated July 6, 1971

Inventor(s) Alvin L. Dubrow

It is certified that error appears in the above-identified patent and that said Letters Patent are hereby corrected as shown below:

On the cover sheet after [72] Inventor, "Alvin L. DuBrown" should read -- Alvin L. Dubrow --.

Signed and sealed this 17th day of October 1972.

(SEAL)
Attest:

EDWARD M. FLETCHER, JR.
Attesting Officer

ROBERT GOTTSCHALK
Commissioner of Patents